(12) United States Patent
Wu et al.

(10) Patent No.: US 12,251,060 B2
(45) Date of Patent: Mar. 18, 2025

(54) CLEANING ROBOT AND METHOD FOR CONTROLLING SAME

(71) Applicant: Beijing Roborock Technology Co., Ltd., Beijing (CN)

(72) Inventors: Qi Wu, Beijing (CN); Song Peng, Beijing (CN)

(73) Assignee: BEIJING ROBOROCK TECHNOLOGY CO., LTD., Beijing (CN)

( * ) Notice: Subject to any disclaimer, the term of this patent is extended or adjusted under 35 U.S.C. 154(b) by 229 days.

(21) Appl. No.: 17/640,301

(22) PCT Filed: Aug. 20, 2020

(86) PCT No.: PCT/CN2020/110255
§ 371 (c)(1),
(2) Date: Mar. 3, 2022

(87) PCT Pub. No.: WO2021/043002
PCT Pub. Date: Mar. 11, 2021

(65) Prior Publication Data
US 2022/0338699 A1 Oct. 27, 2022

(30) Foreign Application Priority Data
Sep. 5, 2019 (CN) .......................... 201910837584.0

(51) Int. Cl.
*A47L 11/28* (2006.01)
*A47L 11/40* (2006.01)
*H02J 7/00* (2006.01)

(52) U.S. Cl.
CPC ........... *A47L 11/4011* (2013.01); *A47L 11/28* (2013.01); *A47L 11/4005* (2013.01);
(Continued)

(58) Field of Classification Search
None
See application file for complete search history.

(56) References Cited

U.S. PATENT DOCUMENTS 5,609,431 A * 3/1997 Carroll .................... A47L 13/10
401/200
5,636,402 A 6/1997 Kubo et al.
(Continued)

FOREIGN PATENT DOCUMENTS

| CN | 101444407 A | | 6/2009 |
| CN | 202145582 | * | 2/2012 |

(Continued)

OTHER PUBLICATIONS

Translation of CN207548770 by Gao, published Jun. 29, 2018.*
(Continued)

*Primary Examiner* — Mikhail Kornakov
*Assistant Examiner* — Ryan L Coleman
(74) *Attorney, Agent, or Firm* — Calfee, Halter & Griswold LLP (57) ABSTRACT

An embodiment of the present disclosure provides a cleaning robot and a control method thereof. The cleaning robot includes: a chassis; a fluid applicator, carried on the chassis and configured to distribute a cleaning fluid on at least part of a cleaning width; a fluid storage apparatus, detachably connected to the chassis, wherein the fluid storage apparatus is in communication with the fluid applicator and configured to apply the cleaning fluid distributed by the fluid applicator to a floor; and a control unit, carried on the chassis and configured to control the fluid applicator to stop distributing the cleaning fluid in a case that a to-be-cleaned area of the floor reaches a preset value.

13 Claims, 8 Drawing Sheets

S702 — A navigation apparatus monitors a cleaned area in real time and reports the cleaned area to a control unit which calculates a to-be-cleaned area according to the cleaned area S704 — The control unit controls a fluid applicator to stop distributing a cleaning fluid when a to-be-cleaned area of the ground reaches a preset value (52) U.S. Cl.
CPC ....... *A47L 11/4008* (2013.01); *A47L 11/4066* (2013.01); *A47L 11/4083* (2013.01); *A47L 11/4088* (2013.01); *H02J 7/007188* (2020.01); *A47L 2201/022* (2013.01); *A47L 2201/04* (2013.01); *A47L 2201/06* (2013.01)

(56) References Cited

U.S. PATENT DOCUMENTS

| | | | | |
|---|---|---|---|---|
| 8,898,844 | B1 * | 12/2014 | Dooley | A47L 11/10 |
| | | | | 15/49.1 |
| 2014/0209122 | A1 * | 7/2014 | Jung | A47L 11/24 |
| | | | | 15/3 |
| 2016/0008982 | A1 * | 1/2016 | Artes | B25J 11/0085 |
| | | | | 700/254 |
| 2017/0367553 | A1 * | 12/2017 | Liang | A47L 11/4047 |
| 2018/0028035 | A1 | 2/2018 | Hyun et al. | |
| 2019/0049976 | A1 * | 2/2019 | Erkek | A47L 9/2884 |
| 2019/0179325 | A1 * | 6/2019 | Deng | A47L 11/4011 |
| 2019/0227566 | A1 * | 7/2019 | Marutani | G05D 1/0246 |
| 2019/0243373 | A1 * | 8/2019 | Kuo | H02J 7/0042 |
| 2019/0265718 | A1 * | 8/2019 | Lee | A01D 34/008 |
| 2020/0069134 | A1 * | 3/2020 | Ebrahimi Afrouzi | A47L 11/4036 |
| 2020/0293060 | A1 * | 9/2020 | Jeong | A47L 9/2826 |

FOREIGN PATENT DOCUMENTS

| | | |
|---|---|---|
| CN | 102578973 A | 7/2012 |
| CN | 103220958 A | 7/2013 |
| CN | 104898670 A | 9/2015 |
| CN | 205458463 U | 8/2016 |
| CN | 205458464 U | 8/2016 |
| CN | 106073634 A | 11/2016 |
| CN | 106166050 A | 11/2016 |
| CN | 107877521 A | 4/2018 |
| CN | 207548770 * | 6/2018 |
| CN | 207640334 U | 7/2018 |
| CN | 108606740 A | 10/2018 |
| CN | 108873879 A | 11/2018 |
| CN | 108937749 A | 12/2018 |
| CN | 109199251 A | 1/2019 |
| CN | 109199255 A | 1/2019 |
| CN | 109222769 A | 1/2019 |
| CN | 109602338 A | 4/2019 |
| CN | 208769702 U | 4/2019 |
| CN | 109864670 A | 6/2019 |
| CN | 110051281 A | 7/2019 |
| CN | 209153456 U | 7/2019 |
| CN | 110495821 A | 11/2019 |
| CN | 210931182 U | 7/2020 |
| KR | 20180042923 A | 4/2018 |
| TW | 201928561 A | 7/2019 |

OTHER PUBLICATIONS

Translation of CN202145582 by Zuo, published Feb. 15, 2012.*
PCT, International Search Report for PCT/CN2020/110255, Nov. 24, 2020.
TW, Office Action for Taiwanese application No. 109130111, Apr. 29, 2021.
TW, Office Action for Taiwanese Application No. 109130111, May 20, 2022.
Allowance from Chinese Application No. 201910837584.0 dated Aug. 30, 2023.
Communication from from Chinese Application No. 201910837584.0 dated Apr. 19, 2023.

* cited by examiner

CLEANING ROBOT AND METHOD FOR CONTROLLING SAME

CROSS REFERENCE TO RELATED APPLICATIONS

This application is a U.S. national phase of a PCT application PCT/CN2020/110255 filed on Aug. 20, 2020, which claims priority to Chinese Patent Application No. 201910837584.0 filed on Sep. 5, 2019, which is incorporated herein by reference in its entirety.

TECHNICAL FIELD

The present disclosure relates to the technical field of control, and in particular, to a cleaning robot and a control method thereof.

BACKGROUND

A surface cleaning apparatus is required to use a piece of liquid-wetted cloth in a cleaning process of household floor. The liquid-wetted cloth is disposed under a cleaning liquid container containing a cleaning liquid, to absorb an amount of cleaning liquid from the container. Then, the liquid-wetted cloth is moved over a surface to apply the cleaning liquid to the surface. The liquid-wetted cloth interacts with pollutants on the floor to absorb the pollutants thereon, thereby achieving a cleaning purpose.

Currently, a household surface cleaning apparatus has a mopping function. The surface cleaning apparatus includes a liquid storage container accommodated in a chassis and storing a cleaning liquid therein for supplying. In a case that a cleaning process is completed, the surface cleaning apparatus autonomously returns to a charging station for charging.

However, in a case that the apparatus returns to the charging station for charging with water in the container not used up, water in the container may continue to seep, and may apt to result in a wet region near the charging station in a long term, thereby eroding a floor surface (wood floor) and causing a potential risk of short-circuit to the charging station.

Usually, a water discharge amount is controlled by a diaphragm pump assembly.

In a technical solution, a surface cleaning apparatus is equipped with a diaphragm pump assembly which is provided with a peristaltic pump for pumping a cleaning fluid from a container and delivering the cleaning fluid to at least one bottom water outlet, and a mechanical actuator for actuating the peristaltic pump mechanically. In another technical solution, the surface cleaning apparatus further includes a sensor module for sensing a situation and a power module entirely supported by the chassis and controlled by a main control module, to automatically move a cleaning element on the entire surface substantially according to a predefined definition, to control actuation of the mechanical actuator of the peristaltic pump according to floor conditions, to stop operation of the peristaltic pump if necessary, to stop water discharge, and to increase operation power of the peristaltic pump to discharge more water if necessary. The peristaltic pump has a great flexibility.

SUMMARY

In view of this, an embodiment of the present disclosure provides a cleaning robot and a control method thereof for enabling the robot to mop based on a remaining area.

According to a first aspect of embodiments of the present disclosure, embodiments of the present disclosure provide a cleaning robot, including:
    a chassis;
    a fluid applicator, carried on the chassis and configured to distribute a cleaning fluid onto at least part of a cleaning width;
    a fluid storage apparatus, detachably connected to the chassis, wherein the fluid storage apparatus is in communication with the fluid applicator and configured to apply the cleaning fluid distributed by the fluid applicator onto a floor; and
    a control unit, carried on the chassis and configured to control the fluid applicator to stop distributing the cleaning fluid in a case that a to-be-cleaned area of the floor reaches a preset value.

In an embodiment of the present disclosure, the fluid applicator includes a pump which is configured to distribute the cleaning fluid on the at least part of the cleaning width.

In an embodiment of the present disclosure, the fluid applicator includes a plurality of selectable gears, each gear of the plurality of selectable gears corresponding to a different endurance time and/or a water discharge amount; and
    the preset value is correlated with a gear selected from the plurality selectable gears of the fluid applicator In an embodiment of the present disclosure, the cleaning robot further includes:
    a navigation apparatus, configured to monitor a cleaned area in real time and report the cleaned area to the control unit which obtains the to-be-cleaned area according to the cleaned area.

In an embodiment of the present disclosure, the cleaning robot further includes:
    an energy storage unit, supported by the chassis and configured to just reach a charging threshold in a case of completing cleaning of the to-be-cleaned area.

In an embodiment of the present disclosure, the energy storage unit includes at least one charging contact sheet, configured to be charged in a case that the robot is located at a charging station.

In an embodiment of the present disclosure, the cleaning robot further includes:
    a wheel type drive, supporting the chassis and being operable to operate the cleaning robot on a cleaning surface; and
    one or more cleaning elements, carried on the chassis to clean an entire of the cleaning width.

In an embodiment of the present disclosure, the cleaning robot further includes:
    a liquid level detector, disposed in the fluid storage apparatus and configured to measure a liquid amount in the fluid storage apparatus in real time in a case that the robot performs a task, and to transmit an alarm signal to the control unit in a case that the liquid amount is lower than an early warning value.

According to a second aspect of embodiments of the present disclosure, an embodiments of the present disclosure provides a method of controlling a fluid of a cleaning robot, including:
    monitoring, by a navigation apparatus, a cleaned area in real time and reporting the cleaned area to a control unit which determines a to-be-cleaned area according to the cleaned area; and
    controlling, by the control unit, a fluid applicator to stop distributing a cleaning fluid in a case that the to-be-cleaned area reaches a preset value.

In an embodiment of the present disclosure, the fluid applicator includes a plurality of selectable gears, each gear of the plurality of selectable gears corresponding to a different endurance time and/or a water discharge amount; and the preset value is correlated with a gear selected from the plurality of selectable gears of the fluid applicator In an embodiment of the present disclosure, the preset value is configured to enable an energy storage unit to just reach a charging threshold in a case of completing cleaning of the to-be-cleaned area.

In an embodiment of the present disclosure, in a case that the energy storage unit reaches the charging threshold, the cleaning robot moves to a charging station for charging through a charging contact sheet of the energy storage unit.

In an embodiment of the present disclosure, a liquid level of the fluid storage apparatus is monitored in real time in a case that the cleaning robot performs a task, and an alarm signal is transmitted to the control unit in a case that the liquid level is lower than an early warning value; and the control unit changes traveling characteristics of the cleaning robot and presents liquid shortage prompt information to a user.

In an embodiment of the present disclosure, the method further includes: continuing, by the cleaning robot, the task after receiving a cleaning continuation instruction from the user.

In an embodiment of the present disclosure, the preset value is correlated with a material of a floor.

In an embodiment of the present disclosure, calculating the to-be-cleaned area according to the cleaned area includes:

determining a difference between a total area and the cleaned area as the to-be-cleaned area, wherein the total area is obtained according to one of followings:

for a global cleaning mode, determining a maximum area that is cleaned autonomously in a history of global cleaning as the total area;

for a region-selection cleaning mode, determining a sum of areas of all selected regions as the total area; and for a region-division cleaning mode, determining a sum of areas of all divided regions as the total area.

BRIEF DESCRIPTION OF DRAWINGS

To explain the technical solutions in the embodiments according to the present disclosure, the accompanying drawings used in the description of the embodiments will be briefly described below. Obviously, the accompanying drawings in the following description are only some embodiments of the present disclosure, and one of ordinary skill in the art may further obtain other drawings based on these accompanying drawings without creative efforts.

DESCRIPTION OF EMBODIMENTS

To make the objectives, technical solutions, and advantages of the embodiments of the present disclosure clearer, the following clearly and completely describes the technical solutions in the embodiments according to the present disclosure with reference to the accompanying drawings in the embodiments of the present disclosure. Obviously, the described embodiments are merely some embodiments, other than all embodiments, of the present disclosure. All other embodiments derived based on the embodiments of the present disclosure by one of ordinary skill in the art without creative efforts shall fall within the protection scope of the present disclosure.

It should be understood that although the terms "first", "second", "third", and the like may be used to describe "XXX" in the embodiments of the present disclosure, these "XXX" shall not be limited to these terms. These terms are only used to distinguish "XXX" from each other. For example, without departing from the scope of the embodiments of the present disclosure, the "first XXX" may alternatively be referred to as the "second XXX", and similarly, the "second XXX" may alternatively be referred to as the "first XXX".

Figure 1:
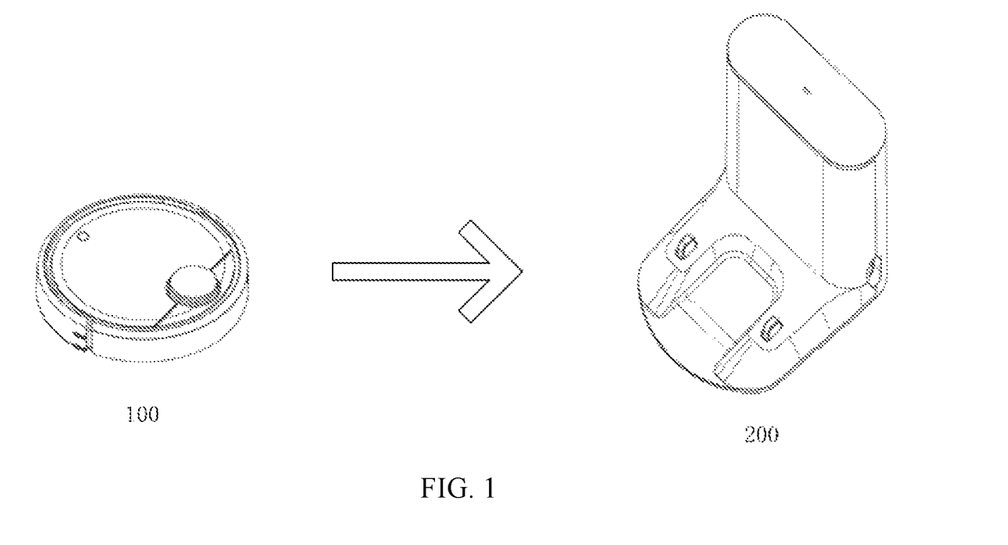
FIG. 1 is a schematic diagram of an application scenario according to an embodiment of the present disclosure.

In order to describe the behaviors of the robot more clearly, the following direction definitions are provided:

In an application scenario diagram of the present disclosure, as illustrated in FIG. 1, an autonomous cleaning robot 100 performs cleaning operation in a designated region. In a case that the cleaning operation is completed or in a case that power is low, the autonomous cleaning robot 100 automatically search for a position of a charging station 200. After the position of the charging station 200 is determined, the autonomous cleaning robot 100 automatically travels to the position of the charging station 200 for charging.

Figure 2:
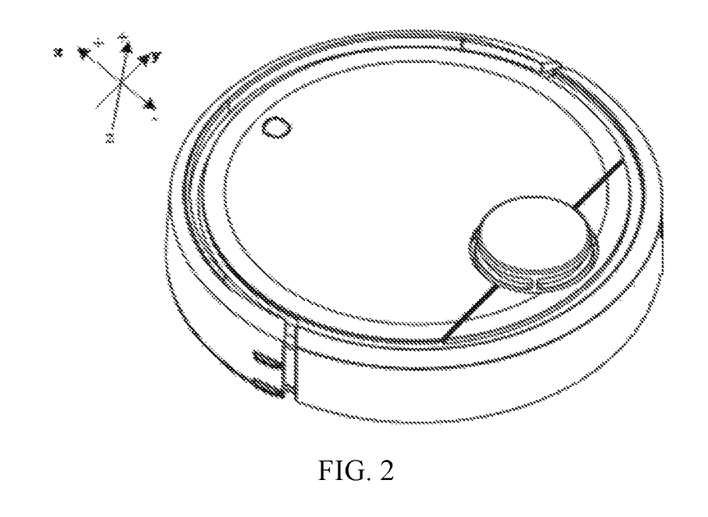
FIG. 2 illustrates a three-dimensional view of a structure of a robot according to an embodiment of the present disclosure.

As illustrated in FIG. 2, the autonomous cleaning robot 100 may travel on the floor through various combinations of movements with respect to the following three mutually perpendicular axes defined by a machine body 110: a front-rear axis X, a transverse axis Y, and a central vertical axis Z. A forward driving direction along the front-rear axis X is referred as "forward", and a backward driving direction along the front-rear axis X is referred as "backward". The direction of the transverse axis Y is a direction in which an axis defined by a center point of a drive wheel module 141 extends between a right wheel and a left wheel of the autonomous cleaning robot.

The autonomous cleaning robot 100 may rotate around the Y axis. "Upward" designates a case that a forward portion of the autonomous cleaning robot 100 is tilted upward, and a backward portion is tilted downward; and "downward" designates a case that the forward portion of the autonomous cleaning robot 100 is tilted downward, and the backward portion is tilted upward. In addition, the autonomous cleaning robot 100 may rotate around the Z axis. In a forward direction of the autonomous cleaning robot 100, "turn right" designates a case that the autonomous cleaning robot 100 is turned to a right side of the X axis; and "turn left" designates in a case that the autonomous cleaning robot 100 is turned to a left side of the X axis.

Figure 3:
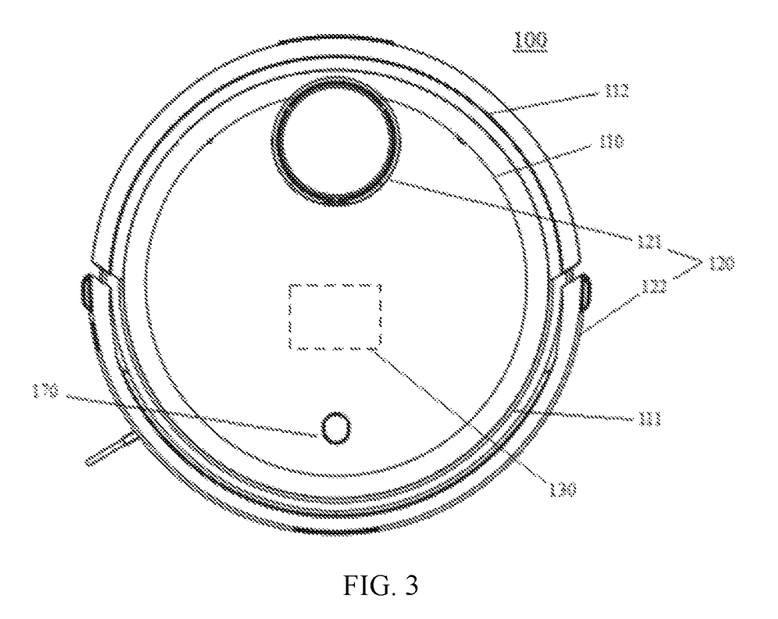
FIG. 3 illustrates a top view of a structure of a robot according to an embodiment of the present disclosure.

As illustrated in FIG. 3, the autonomous cleaning robot 100 includes a machine body 110, a sensing system 120, a control system, a drive system 140, a cleaning system 150, a power supply system 160, and a human-machine interaction system 170.

The machine body 110 includes a front portion 111, a rear portion 112, and a chassis 113. The machine body 110 has a substantially circular shape (both the front portion and the rear portion are circular), and may alternatively have other shapes, including, but not limited to, a substantially D shape in which the front portion is square and the rear portion is circular.

As illustrated in FIG. 3, the sensing system 120 includes a location determining apparatus 121 located above the machine body 110, a buffer 122 disposed at the front portion 111 of the machine body 110, and a sensing device such as a cliff sensor 123 and an ultrasonic sensor, an infrared sensor, a magnetometer, an accelerometer, a gyroscope, and an odometer, and provides various position information and movement state information of the autonomous cleaning robot to a control system 130. The location determining apparatus 121 includes, but is not limited to, a camera and a laser distance sensor (LDS). The following takes the laser distance sensor adopting a triangle ranging method as an example to explain how to determine the location. The basic principle of the triangle ranging method is based on an equivalence relationship between similar triangles, which is not described in detail herein.

The laser distance sensor includes a light emitting unit and a light receiving unit. The light emitting unit may include a light source that emits light, and the light source may include a light emitter, such as an infrared or visible light emitting diode (LED) that emits infrared light or visible light. Alternatively, the light source may be a light emitter that emits a laser beam. In this embodiment, the laser diode (LD) is used as a light source. In an embodiment of the present disclosure, due to the monochrome, directivity and collimating characteristics of a laser beam, adopting a light source of a laser beam may make a relatively accurate measurement with respect to other light. The laser diode (LD) may emit a spot laser to measure two-dimensional location information of an obstacle, or may emit a line laser to measure three-dimensional location information of an obstacle within a range.

A light receiving unit may include an image sensor on which a light spot reflected or scattered by an obstacle is formed. The image sensor may be an assembly of a plurality of unit pixels in a single row or a plurality of rows. These light receiving elements may convert optical signals into electric signals. The image sensor may be a complementary metal-oxide-semiconductor (CMOS) sensor or a charge-coupled device (CCD) sensor. In an embodiment of the present disclosure, the CMOS is adopted due to its advantages in cost. Moreover, the light receiving unit may include a light receiving lens assembly. Light reflected or scattered by an obstacle may pass through the light receiving lens assembly to form an image on the image sensor. The light receiving lens assembly may include a single lens or a plurality of lenses. A base may support the light emitting unit and the light receiving unit, which are arranged on the base and are spaced apart from each other by a distance. To range an obstacle around the autonomous cleaning robot, the base may be rotatably disposed on the machine body 110. Or, a rotating element may be provided to rotate the emitted light emitter and the received light, without rotating the base. A rotational angular velocity of the rotating element may be obtained by arranging a light coupling element and a code disc. The light coupling element senses a tooth notch in the code disc, and an instantaneous angular velocity may be obtained by dividing a circumferential length of the tooth notch by a notch passing time. The greater a density of tooth notches in the code disc is, the more accuracy the measurement is and the more precision the measurement is, while the more precision the structure is, and the greater the calculation complexity is. On the contrary, the less a density of tooth notches in the code disc is, the less accuracy the measurement is and the less precision the measurement is, while the less precision the structure is, and the less the calculation complexity is, thereby reducing cost.

A data processing device such as a DSP connected to the light receiving unit records distance values of obstacles at all angles relative to a 0-degree angle of the cleaning robot and transmits the distance values to a data processing unit of a control system 130, such as an application processor (AP) including a CPU, wherein the CPU obtains a current location of the robot though performing a particle filtering-based locating algorithm, so that the robot create a map for navigation based on the location. In an embodiment of the present disclosure, the locating algorithm adopts the simultaneous localization and mapping (SLAM).

The laser distance sensor based on the triangular ranging method may measure a distance value at an infinite distance beyond a distance in principle, but in fact, a long-distance measurement, for example, more than 6 meters, is very difficult to achieve mainly due to the restriction of a size of pixel units of the sensor of the light receiving unit and further influences of a photoelectric conversion speed of the sensor, a data transmission speed between the sensor and the connected DSP, and a calculation speed of the DSP. Change in a measured result due to effect on the laser distance sensor apparatus by a temperature may be intolerable for the system mainly due to the fact that thermal expansion and deformation of a structure between the light emitting unit and the light receiving unit causes angle changes between incident light and emergent light. A temperature drift may also occur to the light emitting unit and the light receiving unit. After the laser distance sensor is operated for a long time, deformation caused by accumulation of various factors such as temperature changes and vibration may further severely affect the measurement result. Accuracy of the measurement result directly determines accuracy of creating map, which is a basis for the cleaning robot to further perform a strategy.

As illustrated in FIG. 3, the front portion 111 of the machine body 110 may carry a buffer 122. In a case that the drive wheel module 141 propels the robot to travel on the floor in a cleaning process, the buffer 122 detects one or more events in a traveling path of the autonomous cleaning robot 100 through a sensor system, such as an infrared sensor. The autonomous cleaning robot 100 may control the drive wheel module 141 to respond to events, such as obstacles and walls, detected by the buffer 122, to for example stay away from the obstacles.

The control system 130 is mounted on a main circuit board of the machine body 110, including a computing processor, such as a central processing unit and an application processor, in communication with a non-transitory memory, such as a hard disk, a flash memory, and a random access memory, and based on obstacle information fed back by the laser distance sensor, the application processor create an instant map of the environment where the robot is located through a locating algorithm, such as the SLAM. In combination with distance information and speed information fed back by the sensing apparatus, such as the buffer 122, the cliff sensor 123 and the ultrasonic sensor, the infrared sensor, the magnetometer, the accelerometer, the gyroscope, and the odometer, the control system 130 comprehensively determines which operation state the autonomous cleaning robot is currently in, such as crossing a door threshold, climbing onto a carpet, being located at a cliff, being stuck at an upper position or at a lower position, a dust box being full, and being taken up, and may further provide a next specific action strategy for different situations, making operation of the autonomous cleaning robot meet requirements of a user well, and providing a good user experience. Further, the control system 130 may plan a cleaning routine and a cleaning manner, both of which are relatively efficient and reasonable, based on instant map information created through the SLAM, thereby improving the cleaning efficiency of the robot.

Figure 4:
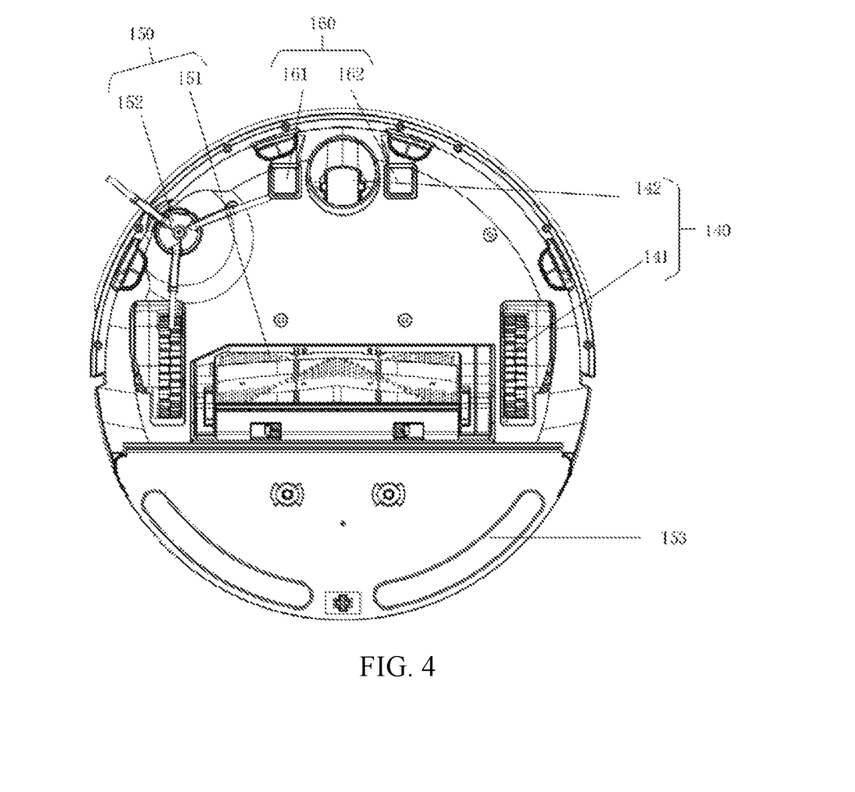
FIG. 4 illustrates a bottom view of a structure of a robot according to an embodiment of the present disclosure.

As illustrated in FIG. 4, the drive system 140 may drive the autonomous cleaning robot 100 to travel across the floor based on driving instructions having distance and angle information, such as x, y, and 0 components. The drive system 140 includes a drive wheel module 141 which may control left and right wheels at the same time. To control movement of the machine more accurately, the drive wheel module 141 includes a left drive wheel module and a right drive wheel module. The left and right drive wheel modules are disposed opposite to each other along the transverse axis defined by the machine body 110. To enable the autonomous cleaning robot to move more stably on the floor or have a stronger motion ability, the autonomous cleaning robot may include one or more driven wheel 142, which includes, but are not limited to, an universal wheel. The drive wheel module includes a traveling wheel, a drive motor, and a control circuit configured to control the drive motor. The drive wheel module may further be connected to both a circuit configured to measure a drive current and an odometer. The drive wheel module 141 may be detachably connected to the machine body 110 to facilitate disassembly and maintenance. The drive wheel may have an offset drop-type suspension system, which is fastened to the machine body 110 of the autonomous cleaning robot in a movable manner, for example, rotatably attached to the machine body 110 of the autonomous cleaning robot, and configured to receive a spring bias downward and biased away from the machine body 110 of the autonomous cleaning robot. The spring bias allows the drive wheel to maintain contact and traction with the floor with a grounding force, and a cleaning element of the autonomous cleaning robot 100 further contact the floor 10 with a pressure.

The cleaning system may be a dry cleaning system 150 and/or a wet cleaning system 153. As a dry cleaning system, main cleaning functions of the system are provided by a cleaning system 151 consisting of a brushroll, a dust box, a fan, an air outlet, and connecting components between the four. The brushroll with a degree of interference with the floor sweeps garbage on the floor, takes it to a front of a dust suction opening between the brushroll and the dust box, and then suctions it into the dust box by a gas with a suction force which is generated by the fan and passes through the dust box. Dust removal capacity of the floor sweeper may be represented by cleaning efficiency of the garbage. The cleaning efficiency is affected by the structure and materials of the brushroll, and is also affected by a wind power utilization rate of an air duct formed by the dust suction opening, the dust box, the fan, the air outlet and the connecting components between the four, and by a type and power of the fan. Compared with ordinary plug-in vacuum cleaners, improvement in dust removal capacity is more significant for cleaning robots with limited energy. The improvement in the dust removal capacity directly reduces energy requirements, that is, the machine that may clean floor of 80 square meters with one charge originally can be improved to clean 100 square meters or more with one charge. In addition, a service life of a battery can be further prolonged greatly by reducing the number of charging times, so that a frequency of battery replacements by a user may further be decreased. The improvement in the dust removal capacity relates to the most apparent and important user experience, and the user may directly draw a conclusion whether sweeping/wiping is well done or not. The dry cleaning system may further include an edge brush 152 provided with a rotating shaft that is angled relative to the floor for bringing debris into a region of the brushroll of the cleaning system.

The wet cleaning system 153 mainly includes a detachable water tank (not shown) provided at a rear end of the chassis. The water tank is secured to a bottom end of the chassis by a snap structure or a plurality of securing screws. A bottom layer of the water tank includes a detachable mop (not shown), which is attached to a bottom layer of the water tank through pasting.

The energy system 160 includes a rechargeable battery, such as a nickel-metal hydride battery and a lithium battery. The rechargeable battery may be connected to a charging control circuit, a battery pack charging temperature detecting circuit, and a battery under-voltage monitoring circuit, which are further connected to a single chip microcomputer control circuit. The autonomous cleaning robot is connected to the charging station through a charging electrode (which may be provided as a first charging contact sheet 161 and a second charging contact sheet 162) disposed on a side of the machine body or under the chassis for charging.

The human-machine interaction system 170 includes a button on a panel of the autonomous cleaning robot, the button configured for a user to select a function, further includes a display screen and/or an indicator lamp and/or a speaker, the display, the indicator lamp and the speaker presenting the user a current state of the autonomous cleaning robot or function options, and may further include a mobile phone client program. For a navigated autonomous cleaning robot, a mobile phone client may present a user a map of an environment in which the device is located and the location of the autonomous cleaning robot, and may provide the user with more enriched and more humanized function options.

Figure 5:
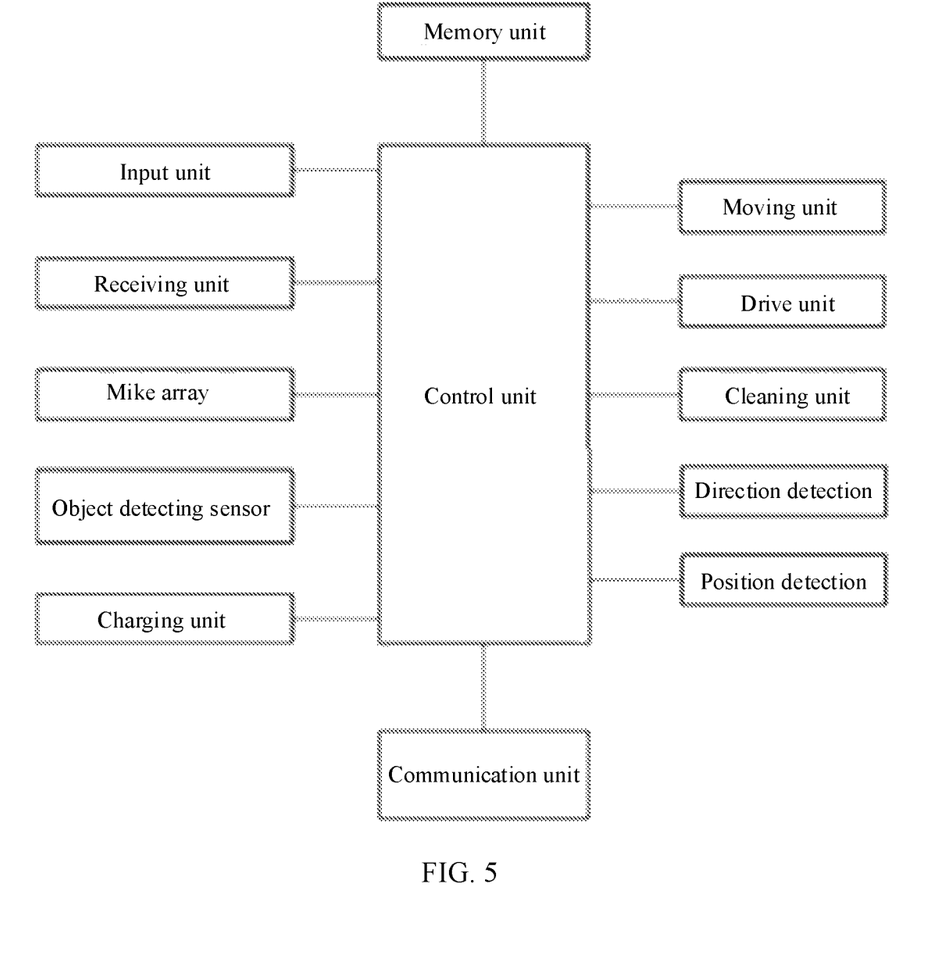
FIG. 5 illustrates a structural block diagram of a robot according to an embodiment of the present disclosure.

FIG. 5 illustrates a block diagram of electrical connection of an autonomous cleaning robot according to an embodiment of the present disclosure.

The autonomous cleaning robot according to the present embodiment may include a microphone array unit configured to recognize a voice of a user, a communication unit configured to communicate with a remote control device or another device, a moving unit configured to drive the machine body, a cleaning unit, and a memory unit configured to store information. An input unit (i.e., a button of a cleaning robot, or the like), an object detecting sensor, a charging unit, a microphone array unit, a direction detecting unit, a location detecting unit, a communication unit, a drive unit, and a memory unit may be connected to the control unit to transmit predetermined information to the control unit or receive predetermined information from the control unit.

The microphone array unit may compare voice input through the receiving unit with information stored in the memory unit to determine whether or not the input voice corresponds to an instruction. If it is determined that the input voice corresponds to an instruction, the corresponding instruction is transmitted to the control unit. If it is determined that the detected voice cannot match the information stored in the memory unit, the detected voice may be taken as noise and therefore is ignored.

For example, the detected voice corresponds to words "come, come here, get here, arrive here", and there is a text control instruction (come here) stored in the information of the memory unit corresponding to the words. In this case, the corresponding instruction may be transmitted to the control unit.

The direction detecting unit may detect a direction of the voice based a time difference or level of the voice input to the plurality of receiving units. The direction detecting unit transmits a detected direction of the voice to the control unit. The control unit may determine a moving path based on the detected direction of the voice by the direction detecting unit.

The location detecting unit may detect coordinates of the machine body in predetermined map information. In an embodiment, a current position of the machine body can be detected by comparing information detected by a camera and map information stored in the memory unit. In addition to the camera, the location detecting unit may further adopt a global positioning system (GPS).

In a broad sense, the location detecting unit may detect whether the machine body is located at a specific location or not. For example, the location detecting unit may include a unit configured to detect whether the machine body is located at the charging station or not.

For example, in a method of detecting whether the machine body is located at the charging station or not, whether or not the machine body is located at the charging station may be detected according to whether electric power is input into the charging unit or not. For another example, whether or not the machine body is located at the charging position may be detected by a charging position detecting unit disposed on the machine body or on the charging station.

The communication unit may transmit/receive predetermined information to/from the remote control device or another device. The communication unit may update map information of the autonomous cleaning robot.

The drive unit may operate the moving unit and the cleaning unit. The drive unit may move the moving unit along a moving path determined by the control unit.

The memory unit stores predetermined information correlated to operation of the cleaning robot. For example, map information of a region where the autonomous cleaning robot is located, control instruction information corresponding to a voice recognized by the microphone array unit, directional angle information detected by the direction detecting unit, location information detected by the location detecting unit, and obstacle information detected by the object detecting sensor may be stored in the memory unit.

The control unit may receive information detected by the receiving unit, the camera, and the object detecting sensor. The control unit may recognize the voice of the user, detect a direction in which the voice occurs, and detect a location of the autonomous cleaning robot based on the received information. In addition, the control unit can further operate the moving unit and the cleaning unit.

According to embodiments of the present disclosure, an autonomous cleaning robot is provided, including: a chassis; and a fluid applicator, carried on the chassis and electrically connected to a control system, the fluid applicator including a pump, through which a cleaning fluid is distributed in at least part of a cleaning width, for example, distributing the cleaning fluid through a position in contact with a central position (a water outlet) of a mop. The autonomous cleaning robot further includes a water tank, detachably connected to the chassis, wherein the water tank is in communication with the fluid applicator and configured to apply the cleaning fluid distributed by the fluid applicator onto the floor. The autonomous cleaning robot further includes a control system, carried on the chassis and configured to control the fluid applicator to stop distributing the cleaning fluid in a case that a to-be-cleaned area of the floor reaches a preset value.

In an embodiment of the present disclosure, the fluid applicator includes a plurality of selectable gears, each gear of the plurality of selectable gears respectively corresponding to an endurance time and/or water discharge amount; and the preset value is correlated with a selected gear of the fluid applicator. As illustrated in the following table:

| water tank of 290 ml | | | |
|---|---|---|---|
| | Endurance | Water discharge amount per min | Water discharge amount $m^2$ |
| Low | 150 min | 1.9 g/min | 1.9 $g/m^2$ |
| Middle | 120 min | 2.4 g/min | 2.4 $g/m^2$ |
| High | 90 min | 3.2 g/min | 3.2 $g/m^2$ |

The cleaning cloth may be dried after being mopping an area of 3-6 $m^2$ after the water is stopped As illustrated in the table above, the higher gear, the less endurance, the higher water outlet speed, and the larger water discharge amount, in which case, the mop gets wetted relatively fast. The controller may monitor the current gear and determine a relationship between the remaining area and the water discharge amount in real time to ensure that the cleaning cloth just gets a dry state in a case of returning for recharging. In an embodiment, for example, 1 g of water is required for cleaning a floor of 1 square meter. Averagely, the cleaning cloth may get dried after mopping an area of 3-6 $m^2$ since the water is stopped. For a wooden floor, if the remaining area is less than 4 square meters, it is necessary to forcibly shut down the water. In this case, in a case that the autonomous cleaning robot finishes cleaning of the remaining area and returns to the charging station, the cleaning cloth at the bottom is just semi-dry. Therefore, the preset value may be set according to an actual state of floor to be cleaned, for example, it can be set that the water supply is stopped in a case that the remaining area is 4 square meters. The autonomous cleaning robot operates with the wet mop. After the remaining 4 square meters of floor is cleaned, a charging threshold is just reached. The control system controls the autonomous cleaning robot to return to the charging station for charging. At this time, the mop is non-humid.

In an embodiment of the present disclosure, the autonomous cleaning robot further includes a navigation apparatus, where the navigation apparatus calculates a cleaned area by monitoring a traveling trajectory of the autonomous cleaning robot in real time, and reports the cleaned area to the control system, and the control system obtains a to-be-cleaned area according to the cleaned area. The to-be-cleaned area is a difference between a total area and the cleaned area, wherein the total area is calculated according to one of the followings:

for a global cleaning mode, the total area being equal to a maximum area in which autonomous cleaning is completed in a history of global cleaning;

for a region-selection cleaning mode, the total area being equal to a sum of areas of all selected regions; and for a region-division cleaning mode, the total area being equal to a sum of areas of all divided regions.

Figure 6:
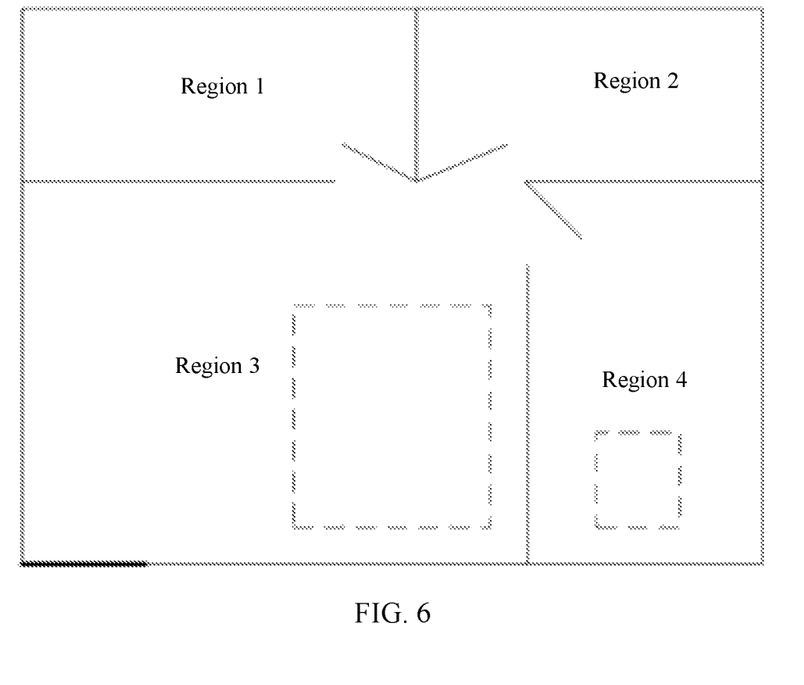
FIG. 6 illustrates a schematic view of a cleaning region of a robot according to an embodiment of the present disclosure.

A designated cleaning mode may be selected through a mobile phone APP or an autonomous cleaning robot configuration interface, and the cleaning mode includes a global cleaning mode, a region-selection cleaning mode, or a region-division cleaning mode. The global cleaning mode refers to cleaning an entire region in a map created by the navigation apparatus of the autonomous cleaning robot, for example, as illustrated in FIG. 6, the entire region of the created map with four sub regions, namely, a region 1 (bedroom 1), a region 2 (bedroom 2), a region 3 (kitchen), and a region 4 (living room). If the global cleaning mode is selected, the regions that the autonomous cleaning robot is required to clean include the four regions of the entire room, and the cleaning area is a sum of the areas of the four regions. The region-selection cleaning mode refers to a mode in which a user may select one or more regions among the region 1 (bedroom 1), region 2 (bedroom 2), region 3 (kitchen), and region 4 (living room) for cleaning. For example, if the region 1 is selected for cleaning, the autonomous cleaning robot performs cleaning within the region 1, and the cleaning area is the area of the region 1. The region-division cleaning mode refers to a mode in which a user may define a range for cleaning in any one or more of the region 1 (bedroom 1), region 2 (bedroom 2), region 3 (kitchen), and region 4 (living room) (for example, dotted regions in FIG. 6), the autonomous cleaning robot subsequently cleans only in a corresponding dotted regions, and the cleaning area is a sum of the areas of the two dotted regions in FIG. 6.

Any total area may be obtained by scanning the entire regions by the navigation apparatus through multiple-time cleanings. The cleaning area or map is stored in the storage device of the autonomous cleaning robot, and may be displayed to a terminal through a user APP, so that the user may set the cleaning process on the APP interface.

In an embodiment of the present disclosure, the autonomous cleaning robot further includes an energy storage unit, supported by the chassis and configured to just reach a charging threshold in a case that cleaning of the to-be-cleaned area is completed. In an embodiment of the present disclosure, the energy storage unit includes at least one charging contact sheet 161 which is in contact with an electrode of the charging station to automatically charge in a case that the autonomous cleaning robot is positioned at a charging station.

An implementation may be described as: in a case that cleaning of the to-be-cleaned area is completed, the control system obtains a remaining capacity of the energy storage unit, and in a case that the remaining capacity is within a chargeable range (for example, 15%-25%), the control system controls the drive system of the cleaning robot to search for a position of the charging station; and in a case that the position of the charging station is obtained, the cleaning robot travels to a charging interface of the charging station for automatic charging.

Another implementation may be described as: in a case that cleaning of the to-be-cleaned area is almost completed (for example, more than 90% of the total area is cleaned), the control system obtains the remaining capacity of the energy storage unit, and in a case that the remaining capacity reaches a threshold indicative of a need for charging (for example, 15%), the control system controls the drive system of the cleaning robot to search for the position of the charging station; and in a case that the position of the charging station is obtained, the cleaning robot travels to the charging interface of the charging station for automatic charging. If the charging threshold is not reached, charging is performed after completing cleaning of the remaining to-be-cleaned area.

In an embodiment of the present disclosure, the autonomous cleaning robot further includes a liquid level detector, disposed in the fluid storage apparatus and configured to measure a liquid amount of the fluid storage apparatus in real time in a case that the autonomous cleaning robot performs a task, and transmit an alarm signal to the control unit in a case that the liquid amount is lower than an early warning value.

The autonomous cleaning robot of the present disclosure can shut down a water outlet in advance according to a remaining cleaning area, so that the wet mop can remain semi-dry or dry after completing cleaning the remaining cleaning area, thereby preventing accumulated water caused by the wet mop while improving cleaning efficiency, avoiding a risk of a short circuit in a case that the autonomous cleaning robot is charged, improving safety of the autonomous cleaning robot, and improving user experience.

Figure 7:
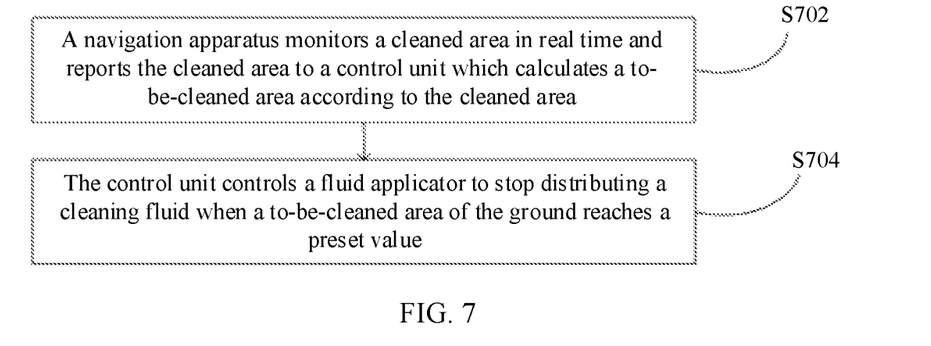
FIG. 7 illustrates a flowchart of a method of controlling a robot according to an embodiment of the present disclosure.

According to embodiments of the present disclosure, a fluid control method of the autonomous cleaning robot is provided. For part of the autonomous cleaning robot that has the same structure, reference may be made to the description above, and the same part has the same technical effect, which is not repeatedly described herein. The control method includes the following, as illustrated in FIG. 7:

Step S702: A navigation apparatus monitors a cleaned area in real time and reports the cleaned area to a control unit which calculates a to-be-cleaned area according to the cleaned area.

Step S704: The control unit controls a fluid applicator to stop distributing a cleaning fluid in a case that a to-be-cleaned area of the floor reaches a preset value.

In an embodiment of the present disclosure, the fluid applicator includes a plurality of selectable gears (for example, three gears), each gear of the plurality of selectable gears respectively corresponding to a different endurance and/or water discharge amount; and the preset value is correlated with the gear selected in the fluid applicator.

| 290 ml water tank | | | |
| --- | --- | --- | --- |
| | Endurance | Water discharge amount per min | Water discharge amount m$^2$ |
| Low | 150 min | 1.9 g/min | 1.9 g/m$^2$ |
| Middle | 120 min | 2.4 g/min | 2.4 g/m$^2$ |
| High | 90 min | 3.2 g/min | 3.2 g/m$^2$ |

The cleaning cloth may be dried after being mopping an area of 3-6 m$^2$ after the water is stopped As illustrated in the table above, the higher gear, the less endurance, the higher water outlet speed, and the larger water discharge amount, in which case, the mop gets wetted relatively fast. The controller may monitor the current gear and determine a relationship between the remaining area and the water discharge amount in real time to ensure that the cleaning cloth just gets a dry state in a case of returning for recharging. In an embodiment, for example, 1 g of water is required for cleaning a floor of 1 square meter. Averagely, the cleaning cloth may get dried after mopping an area of 3-6 m$^2$ since the water is stopped. For a wooden floor, if the remaining area is less than 4 square meters, it is necessary to forcibly shut down the water. In this case, in a case that the autonomous cleaning robot finishes cleaning of the remaining area and returns to the charging station, the cleaning cloth at the bottom is just semi-dry. Therefore, the preset value may be set according to an actual state of floor to be cleaned, for example, it can be set that the water supply is stopped in a case that the remaining area is 4 square meters. The autonomous cleaning robot operates with the wet mop. After the remaining 4 square meters of floor is cleaned, a charging threshold is just reached. The control system controls the autonomous cleaning robot to return to the charging station for charging. At this time, the mop is non-humid.

In an embodiment of the present disclosure, the preset value is configured to enable an energy storage unit to just reach a charging threshold when completing cleaning of the to-be-cleaned area. In a case that the energy storage unit reaches the charging threshold, the autonomous cleaning robot moves to a charging station for charging through the charging contact sheet of the energy storage unit.

An implementation may be described as: in a case that cleaning of the to-be-cleaned area is completed, the control system obtains a remaining capacity of the energy storage unit, and in a case that the remaining capacity is within a chargeable range (for example, 15%-25%), the control system controls the drive system of the cleaning robot to search for a position of the charging station; and in a case that the position of the charging station is obtained, the cleaning robot travels to a charging interface of the charging station for automatic charging.

Another implementation may be described as: in a case that cleaning of the to-be-cleaned area is almost completed (for example, more than 90% of the total area is cleaned), the control system obtains the remaining capacity of the energy storage unit, and in a case that the remaining capacity reaches a threshold indicative of a need for charging (for example, 15%), the control system controls the drive system of the cleaning robot to search for a position of the charging station; and in a case that the position of the charging station is obtained, the cleaning robot travels to the charging interface of the charging station for automatic charging. If the charging threshold is not reached, charging is performed after completing cleaning of the remaining to-be-cleaned area.

In an embodiment of the present disclosure, the liquid level of the fluid storage apparatus is monitored in real time in a case that the autonomous cleaning robot performs a task, and an alarm signal is transmitted to the control unit in a case that the liquid level is lower than an early warning value; and the control unit changes traveling characteristics of the autonomous cleaning robot and shows liquid shortage prompt information to a user. The autonomous cleaning robot continues the previous task after receiving a cleaning continuation instruction from the user.

In an embodiment of the present disclosure, the preset value is correlated with a material of the floor. For example, tile floor is relatively water-saving, and therefore, the preset value of the remaining area may be set larger, such as 6 square meters; and a wooden floor is relatively water-wasting, and therefore, the preset value of the remaining area may be set smaller, such as 4 square meters.

On the other hand, the preset value may be manually modified according to an actual situation. For example, if the preset value is set to 4 square meters and the mop is still wet after the autonomous cleaning robot returns to the position of the charging station, the preset value may be set to a larger value, such as 6 square meters.

In an embodiment of the present disclosure, obtaining the to-be-cleaned area according to the cleaned area includes: the to-be-cleaned area being equal to a difference between a total area and the cleaned area, where the total area is calculated according to one of the following methods:

for a global cleaning mode, the total area being equal to a maximum area in which autonomous cleaning is completed in a history of global cleaning;

for a region-selection cleaning mode, the total area being equal to a sum of areas of all selected regions; and for a region-division cleaning mode, the total area being equal to a sum of areas of all divided regions.

The three modes are described above, and will not be repeatedly described herein.

Any total area may be obtained by scanning the entire regions by the navigation apparatus through multiple-time cleanings. The cleaning area or map is stored in the storage device of the autonomous cleaning robot, and may be displayed to a terminal through a user APP, so that the user may set the cleaning process on the APP interface.

The autonomous cleaning robot of the present disclosure can shut down a water outlet in advance according to a remaining cleaning area, so that the wet mop can remain semi-dry or dry after completing cleaning the remaining cleaning area, thereby preventing accumulated water caused by the wet mop while improving cleaning efficiency, avoiding a risk of a short circuit in a case that the autonomous cleaning robot is charged, improving safety of the autonomous cleaning robot, and improving user experience.

Embodiments of the present disclosure provide a cleaning robot, including a processor and a memory. The memory stores computer program instructions that may be executed by the processor. The processor, during executing of the computer program instructions, implements operations of the method as described in any of the foregoing embodiments.

Embodiments of the present disclosure provide a non-transitory computer-readable storage medium storing computer program instructions that, in a case of being called and executed by a processor, operations of the method as described in any of the embodiments.

Figure 8:
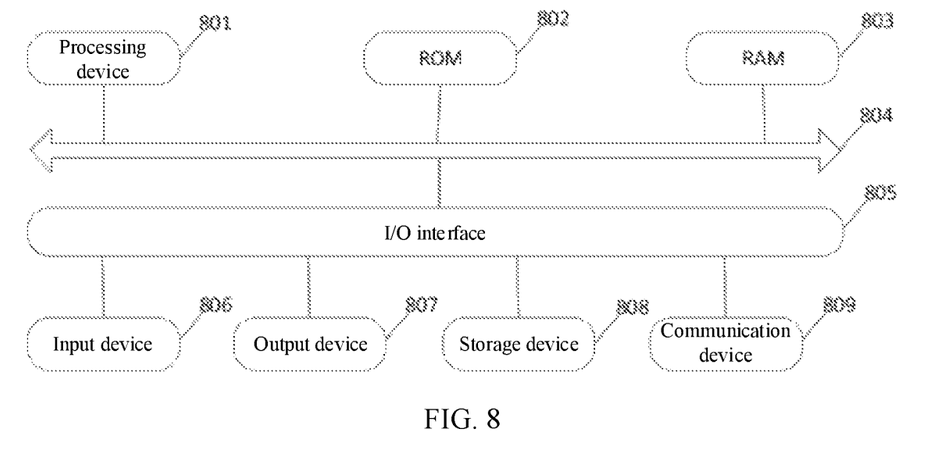
FIG. 8 illustrates a schematic circuit view of a robot according to an embodiment of the present disclosure.

As illustrated in FIG. 8, the autonomous cleaning robot may include a processing device (for example, a central processing unit, a graphics processor, or the like) 801, which may perform various appropriate actions and processes according to programs stored in a read-only memory (RAM) 802 or programs loaded into a random access memory (RAM) 803 from a storage device 808. The RAM 803 further stores various programs and data required for operation of the cleaning robot. The processing device 801, the ROM 802, and the RAM 803 are connected with each other through a bus 804. An input/output (I/O) interface 805 is further connected to the bus 804.

Typically, following devices may be connected to the I/O interface 805: an input device 806 including a touch screen, a touch panel, a keyboard, a mouse, a camera, a microphone, an accelerometer and a gyroscope or the like; an output device 807 including a liquid crystal display (LCD), a speaker, and a vibrator or the like; a storage device 808 including a magnetic tape and a hard disk or the like; and a communication device 809. The communication device 809 may allow the robot to communicate wirelessly or wiredly with another robot to exchange data. Although FIG. 8 illustrates the robot with various apparatuses, it should be understood that it is not required to implement or have all the apparatuses presented. More or fewer apparatuses may be implemented or provided instead.

In particular, according to an embodiment of the present disclosure, the process described above with reference to the flowchart may be implemented as a computer software program. For example, an embodiment of the present disclosure includes a computer program product including a computer program carried on a computer-readable medium, the computer program including program code for performing the method presented in the flowchart. In such an embodiment, the computer program may be downloaded and installed from a network through the communication device 809, or installed from the storage device 808, or installed from the ROM 802. In a case that the computer program is executed by the processing device 801, the above functions defined in the method according to the embodiment of the present disclosure are performed.

It should be noted that the computer-readable medium of the present disclosure may be a computer-readable signal medium or a computer-readable storage medium or any combination thereof. The computer-readable storage medium may be, for example, but not limited to, an electronic, magnetic, optical, electromagnetic, infrared, or semiconductor system, apparatus, or device, or any combination thereof. More specific examples of the computer-readable storage medium may include, but are not limited to: electrical connection with one or more wires, a portable computer disk, a hard disk, a random access memory (RAM), a read-only memory (ROM), an erasable programming read-only memory (EPROM or flash memory), an optical fiber, a portable compact disk read-only memory (CD-ROM), an optical storage apparatus, a magnetic storage apparatus, or any suitable combination thereof. In the present disclosure, the computer-readable storage medium may be any tangible medium that includes or stores a program that may be used by or used in combination by an instruction execution system, apparatus, or device. In the present disclosure, the computer-readable signal medium may include a data signal that is included in a baseband or propagated as part of a carrier wave, and carries computer-readable program code. Such a propagated data signal may use many forms, including but not limited to electromagnetic signals, optical signals, or any suitable combination thereof. The computer-readable signal medium may alternatively be any computer-readable medium other than a computer-readable storage medium, and the computer-readable signal medium may send, propagate, or transmit a program for use by or used in combination by an instruction execution system, apparatus, or device. Program code included in the computer-readable medium may be transmitted by using any appropriate medium, including but not limited to: wires, optical cables, radio frequency (RF), or the like, or any suitable combination thereof.

The computer-readable medium may be included in the foregoing robot, or may exist alone without being assembled to the robot.

Computer program code for performing the operations of the present disclosure may be written in one or more programming languages, or combinations thereof, which include object-oriented programming languages, such as Java, Smalltalk, C++, and further include procedural programming languages, such as "C" language or similar programming languages. The program code may be executed entirely on a user computer, partly on the user computer, as an independent software package, partly on the user computer, partly on a remote computer, or entirely on a remote computer or a server. In the case of relating to the remote computer, the remote computer may be connected to the user computer through any network, including a local area network (LAN) or a wide area network (WAN), or connected to an external computer (such as Internet connection through an Internet service provider).

The flowchart and block diagrams in the accompanying drawings illustrate architectures, functions and operations that are possibly implemented by the systems, methods and computer program products according to various embodiments of the present disclosure. In this regard, each block in the flowchart or block diagram may represent a module, a program segment, or a part of code, which includes one or more executable instructions to implement a specified logical function. It should further be noted that in some alternative implementations, the functions marked in the blocks may alternatively occur in an order different from those marked in the accompanying drawings. For example, two blocks represented one after the other may actually be executed substantially in parallel, and may sometimes be executed in the reverse order, depending on the functions involved. It should further be noted that each block in the block diagrams and/or flowcharts, and combinations of blocks in the block diagrams and/or flowcharts, may be implemented by a dedicated hardware-based system that performs the specified function or operation, or may be implemented with a combination of dedicated hardware and computer instructions.

The units described in the embodiments of the present disclosure may be implemented by software or hardware. The name of the unit does not constitute a limitation on the unit itself in some cases.

The apparatus embodiments described above are only schematic, and the units described as separate parts may or may not be physically separated, and the parts displayed as units may or may not be physical units, that is, may be located at one place, or may be distributed across a plurality of network units. Some or all of the modules may be selected according to actual requirements to achieve the objective of the solution of this embodiment. One of ordinary skill in the art may understand and implement without creative effect.

Finally, it should be noted that the above embodiments are only used to illustrate the technical solution of the present disclosure, but not limited thereto. Although the present disclosure has been described in detail with reference to the foregoing embodiments, one of ordinary skill in the art should understand that modifications to the technical solutions described in the foregoing embodiments, or equivalent replacements of some of the technical features thereof may be made, so that the essence of the corresponding technical solution does not depart from the spirit and scope of the technical solution of various embodiments of the present disclosure.

What is claimed is:

1. A cleaning robot, comprising:
   a chassis;
   a fluid applicator carried on the chassis;
   a fluid storage apparatus detachably connected to the chassis, wherein the fluid storage apparatus is in communication with the fluid applicator and configured to provide a cleaning fluid to the fluid applicator;
   a cleaning cloth configured to clean the floor with the cleaning fluid; and
   a control system carried on the chassis,
   wherein the fluid applicator comprises a plurality of selectable gears, and wherein the selectable gears differ from each other by each gear corresponding to its own unique fluid discharge rate at which cleaning fluid is supplied by the fluid applicator to the cleaning cloth,
   wherein the control system is configured to control the fluid applicator to stop distributing the cleaning fluid when the control system determines that a to-be-cleaned area of the floor reaches a preset value, and wherein the preset value has a magnitude greater than zero and is correlated with a gear selected from the plurality of selectable gears of the fluid applicator.

2. The cleaning robot according to claim 1, further comprising:
a navigation system, configured to monitor a cleaned area in real time and report the cleaned area to the control system which obtains the to-be-cleaned area according to the cleaned area.

3. The cleaning robot according to claim 1, further comprising:
an energy storage unit, supported by the chassis and configured to just reach a charging threshold in a case of completing cleaning of the to-be-cleaned area.

4. The cleaning robot according to claim 1, further comprising:
a wheel type drive, supporting the chassis and being operable to operate the robot on a cleaning surface.

5. The cleaning robot according to claim 1, further comprising:
a liquid level detector, disposed in the fluid storage apparatus and configured to measure a liquid amount in the fluid storage apparatus in response to determining that the robot performs a task, and to transmit an alarm signal to the control system in response to determining that the liquid amount is lower than an early warning value.

6. The cleaning robot according to claim 3, wherein the energy storage unit comprises at least one charging contact sheet, configured to charge in response to determining that the robot is located at a charging station.

7. A method of controlling a cleaning robot, comprising:
monitoring, by a navigation system, a cleaned area and reporting the cleaned area to a control system which obtains a to-be-cleaned area according to the cleaned area;
controlling, by the control system, a fluid applicator of the cleaning robot, wherein the fluid applicator is configured to supply a cleaning fluid to a cleaning cloth of the cleaning robot, wherein the cleaning cloth is configured to clean a floor, wherein the fluid applicator comprises a plurality of selectable gears that differ from each other by each gear corresponding to its own unique fluid discharge rate at which cleaning fluid is supplied by the fluid applicator to the cleaning cloth; and
controlling, by the control system, the fluid applicator to stop distributing the cleaning fluid when the control system determines that the to-be-cleaned area reaches a preset value, and wherein the preset value has a magnitude greater than zero and is correlated with a gear selected from the plurality of selectable gears of the fluid applicator.

8. The method according to claim 7, wherein
the preset value is configured to enable an energy storage unit to just reach a charging threshold in a case of completing cleaning of the to-be-cleaned area.

9. The method according to claim 8, wherein
in response to determining that the energy storage unit reaches the charging threshold, the cleaning robot moves to a charging station for charging through a charging contact sheet of the energy storage unit.

10. The method according to claim 7, wherein
a liquid level of a fluid storage apparatus of the cleaning robot is monitored in response to determining that the cleaning robot performs a task, and an alarm signal is transmitted to the control system in response to determining that the liquid level is lower than an early warning value; and
the control system changes traveling characteristics of the cleaning robot and presents liquid shortage prompt information to a user.

11. The method according to claim 10, further comprising:
continuing, by the cleaning robot, the task after receiving a cleaning continuation instruction from the user.

12. The method according to claim 7, wherein the preset value is correlated with a material of the floor.

13. The method according to claim 7, wherein determining the to-be-cleaned area according to the cleaned area comprises:
determining a difference between a total area and the cleaned area as the to-be-cleaned area, wherein the total area is obtained according to one of followings:
for a global cleaning mode, determining a maximum area in which autonomous cleaning is completed in a history of global cleaning as the total area;
for a region-selection cleaning mode, determining a sum of areas of all selected regions as the total area; and
for a region-division cleaning mode, determining a sum of areas of all divided regions as the total area.

* * * * *